United States Patent [19]

Mobley

[11] Patent Number: 5,646,195
[45] Date of Patent: Jul. 8, 1997

[54] CATALYST FOR POLYURETHANE CARPET BACKINGS AND CARPETS PREPARED THEREWITH

[75] Inventor: Larry Wayne Mobley, Cohutta, Ga.

[73] Assignee: The Dow Chemical Company, Midland, Mich.

[21] Appl. No.: 399,869

[22] Filed: Mar. 7, 1995

[51] Int. Cl.$^6$ .............. C08G 18/24; C08J 9/00; B32B 33/00
[52] U.S. Cl. .......... 521/121; 8/115.6; 427/244; 427/373; 427/389.9; 427/393.5; 428/95; 428/423.1; 428/424.8; 428/96; 521/126; 528/58
[58] Field of Search .................. 521/126, 121; 528/58; 428/95, 423.1, 424.8, 96; 427/244, 389.9, 393.5, 373; 8/115.6

[56] References Cited

U.S. PATENT DOCUMENTS

| | | | |
|---|---|---|---|
| 3,661,885 | 5/1972 | Haddick et al. | 528/53 |
| 3,945,981 | 3/1976 | Robertson | 528/76 |
| 4,006,124 | 2/1977 | Welte et al. | 528/52 |
| 4,038,304 | 7/1977 | Kazama et al. | 528/58 |
| 4,085,072 | 4/1978 | Russo | 521/108 |
| 4,115,320 | 9/1978 | Meyborg | 521/125 |
| 4,119,585 | 10/1978 | Kenney et al. | 521/118 |
| 4,150,212 | 4/1979 | Meyborg | 528/52 |
| 4,379,105 | 4/1983 | Taylor et al. | 264/53 |
| 4,611,044 | 9/1986 | Meyer et al. | 528/56 |
| 4,732,945 | 3/1988 | Dammann | 525/350 |
| 4,788,083 | 11/1988 | Dammann et al. | 427/340 |
| 4,826,617 | 5/1989 | Dammann | 525/107 |
| 5,049,313 | 9/1991 | Frentzel | 252/511 |
| 5,104,693 | 4/1992 | Jenkines | 427/244 |
| 5,166,301 | 11/1992 | Jacobs | 528/67 |
| 5,200,264 | 4/1993 | Frentzel | 428/323 |
| 5,243,012 | 9/1993 | Wicks et al. | 528/58 |
| 5,306,798 | 4/1994 | Horn et al. | 528/58 |

FOREIGN PATENT DOCUMENTS 0 379 246 A2  7/1990  European Pat. Off. .

OTHER PUBLICATIONS

Derwent Abstract 2083962.
Derwent Abstract 1995426.
Derwent Abstract 1990805.
Derwent Abstract 1308367.
Derwent Abstract 0504863.
Derwent Abstract 0449796.
Derwent Abstract 0112244.
Derwent Abstract 0459912.
Derwent Abstract 1132507.
Derwent Abstract 1131559.
Derwent Abstract 1096339.
Derwent Abstract 0952812.
Derwent Abstract 0844573.
Derwent Abstract 0931613.
Derwent Abstract 0718127.
Chemical Abstract 78(12):73186k.
Chemical Abstract 95:(24):205043z.
Chemical Abstract 89(26):216957c.
Chemical Abstract 101(2):8529d.
Chemical Abstract 89(4):25834a.
Chemical Abstract 82(16): 99712m.
Chemical Abstract 96(10):74353w.
Chemical Abstract 100(6):35616r.
Chemical Abstract 84(20):136534u.

*Primary Examiner*—Rabon Sergent

[57] ABSTRACT

Polyurethane foam backed textiles, particularly polyurethane backed carpets can be prepared using a formulation including a dialkyltin sulfide catalyst. Use of the dialkyltin sulfide catalyst allows for a delayed gellation without substantially increasing the time from gellation to cure. The delay in gellation provides for improved handling and backing quality.

4 Claims, No Drawings

CATALYST FOR POLYURETHANE CARPET BACKINGS AND CARPETS PREPARED THEREWITH

BACKGROUND OF THE INVENTION

The present invention relates to polyurethane formulations including a delayed action catalyst. The present invention particularly relates to polyurethane formulations including a delayed action catalyst useful for preparing polyurethane backed textiles.

It is known in the art of preparing textile articles to use polyurethanes as backings in various forms. For example, U.S. Pat. No. 4,296,159 to Jenkines, et al., discloses preparing a tufted or woven article having a unitary backing prepared by applying a polyurethane forming composition to the underside of the tufted or woven article. A different form of polyurethane backing is disclosed in U.S. Pat. No. 5,102,714 to Mobley, et al. wherein the polyurethane backing is a tacky adhesive. It is also known to use polyurethane foam as a cushioning textile backing, as in, for example, U.S. Pat. No. 4,853,280.

The equipment used to prepare polyurethane backed textiles, particularly carpets can be both large and expensive. Therefore, generally, a polyurethane formulation used in carpet manufacturing must be made to accommodate the built in application and cure condition limitations of that equipment and not vice-versa. For example, if a particular piece of carpet backing equipment permits a post application cure of from 1-2 minutes, a formulation having 3 minute cure requirement cannot be used.

One particularly persistent problem with utilizing polyurethane backings in carpet applications is the problem of premature gellation during the polyurethane reaction. Polyurethanes are made by a wide variety of processes differing in detail. However, the basic urethane-forming reaction is the result of contact between an active-hydrogen containing compound, frequently a polyol, i.e., a dihydroxy- or polyhydroxy compound, and a diisocyanate or polyisocyanate. The reaction of these starting materials normally requires the presence of a catalyst. A number of catalysts for this purpose are known. Among those most frequently used are tertiary amines, such as, for example, triethylene diamine and N-substitute morpholines; tin(II) salts of organic acids, such as for example tin(II) octoate; and heavy metals, such as mercury.

In the case of the tertiary amines and tin(II) salts, the catalysts serve to immediately or almost-immediately promote the reaction between the starting materials and thus may perform satisfactorily where processing requires rapid initiation of the reaction. But for some purposes, it is often desirable to delay the reaction and therefore lengthen the time between contact of the components and gelation, thereby achieving greater processing latitude. This is especially desirable in polyurethane carpet backing applications wherein once the gellation begins, the reaction preferably proceeds very rapidly. Greater processing latitude is useful in accommodating the built-in limitations of textile backing application equipment.

Some catalysts exhibit certain disadvantages that may limit their use. The amines and tin salts may result in premature gelation where processing requires additional time following contact between the starting materials. Such may be the case in the preparation of certain polyurethanes such as foams, elastomers, coatings and adhesives, where the formulation components are mixed and then the mixture is poured into a mold or onto a substrate and dispersed before gelation desirably occurs.

It is sometimes desirable to employ alternative, so-called "delayed action" catalysts, such as the heavy metals. But catalysts containing heavy metals, such as mercury, bismuth, barium or cadmium, may present toxicity and environmental safety problems that are difficult to overcome. These catalyst also may not be able to generate a sufficiently quick reaction for preparing carpets once gellation begins to meet the requirements of applying polyurethane backings to textiles.

One method of preventing premature gelation without relying on heavy metals is disclosed in U.S. Pat. No. 3,661,885 to Haddick. That invention is drawn to the use of a preformed complex of a tin(II) salt and an organic complexing agent. But the use of such compounds is not trouble free. The tin(II) salt/amine complexes tend to decompose in the presence of water, which results in loss of catalytic activity. Furthermore, the delay may be insufficient to allow for optimum processing and product quality. Thus, their applicability is somewhat limited.

Therefore, it would be desirable in the art to prepare polyurethane backed textiles with polyurethane formulations which include a delayed action catalyst. It would also be desirable if those catalysts produce both a long delay followed by a quick and complete polyurethane reaction after the onset of gellation. Also desirable would be the avoidance of using particularly toxic compounds as the catalysts.

SUMMARY OF THE INVENTION

In one aspect, the present invention is a polyurethane formulation useful for preparing polyurethane textile backings comprising (1) a polyisocyanate, (2) an active hydrogen containing compound, and (3) a delayed action catalyst, wherein the delayed action catalyst is a dialkyltin sulfide and the formulation is substantially free of other polyurethane catalysts.

In another aspect, the present invention is a polyurethane backed textile comprising a textile and, adherent thereto, a polyurethane backing prepared from polyurethane formulation including (1) a polyisocyanate, (2) an active hydrogen containing compound, and (3) a delayed action catalyst, wherein the delayed action catalyst is a dialkyltin sulfide and the formulation is substantially free of other polyurethane catalysts.

In yet another aspect, the present invention is a process for preparing a polyurethane backed textile comprising the steps of (A) admixing a polyurethane formulation including (1) a polyisocyanate, (2) an active hydrogen containing compound, and (3) a delayed action catalyst, wherein the delayed action catalyst is a dialkyltin sulfide and the formulation is substantially free of other polyurethane catalysts; and (B) applying the polyurethane formulation admixture to a textile.

Still another aspect of the present invention is a polyurethane foam pad comprising a product prepared by a process including the steps of (A) admixing a polyurethane formulation including (1) a polyisocyanate, (2) an active hydrogen containing compound, (3) a delayed action catalyst, and (4) a blowing agent, wherein the delayed action catalyst is a dialkyltin sulfide and the formulation is substantially free of other polyurethane catalysts; and (B) applying the polyurethane formulation admixture to a substrate.

DESCRIPTION OF THE PREFERRED EMBODIMENTS

In one embodiment, the present invention is a polyurethane backed textile. Preferably the polyurethane backed textile is a carpet or carpet tile having at least one polyurethane foam layer. In one form, it is an integral cellular polyurethane foam carpet pad wherein the pad and carpet textile are integrated into one component. This application of a polyurethane layer in a carpet is disclosed in, for example, U.S. Pat. No. 4,853,054, to Turner, et al., which is incorporated herein by reference, and U.S. Pat. No. 5,104, 693 to Jenkines, et al., also incorporated herein by reference.

In another embodiment, the present invention is a carpet pad. Carpet pads are prepared in a manner similar to carpets except that the polyurethane foam is applied to a woven polypropylene substrate. After the polyurethane foam has cured, the pad can be used to supplement padded carpets or as a cushioning support for nonpadded carpets.

The catalyst of the present invention are dialkyltin sulfide catalysts. Most preferably, the dialkyltin sulfide is dibutyltin sulfide, but other alkyl groups, such a methyl and octyl, can be used too. Dibutyltin sulfide is a neat liquid. Preferably, when used with formulations of the present invention, dibutyltin sulfide is used in solution with a solvent compatible with carpet backing formulations such as polyethylene glycol, polypropylene glycol, and the like.

The advantage of using the catalyst of the present invention is that they provide a delayed gellation, but upon the commencement of gellation cure rapidly. As a result, reaction mixtures are lower in viscosity allowing the admixture to flow better onto a textile substrate. Lower reaction mixture viscosity also results in less wear and tear upon pumps. Improvements seen with the present invention include higher production speed and fewer rejects due to gels forming in the application puddle.

Another advantage of the catalysts of the present invention is that they can be hydrolytically stable when mixed with polyols. Some conventional catalysts can hydrolyze when mixed with polyols or polyols and fillers because of water adsorbed or absorbed by those materials. The catalysts of the present invention are more stable than tin II or IV organic acid salts as well as tin IV mercaptides catalysts when exposed to similar wet polyol conditions.

The polyurethane foams of the present invention are preferably prepared in the substantial absence of catalysts other than the dialkyltin sulfides of the present invention. The polyurethane foam formulations of the present invention preferably have no other catalysts present in the formulation. Not excluded are fillers having some slight catalytic effect. Rather, this exclusion is directed to conventional polyurethane catalysts such as: tertiary amine catalysts such as triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethyl aminopropylamine, dimethylbenzyl amine and the like; organotin catalysts such as dimethyltin dilaurate, dibutyltin dilaurate, dioctyltin dilaurate, stannous octoate and the like; and isocyanurate catalysts such aliphatic and aromatic tertiary amine compounds, organometallic compounds, alkali metal salts of carboxylic acids, phenols, symmetrical triazine derivatives, and the like. Preferably the formulations of the present invention have other catalyst present in a weight ratio of dialkyltin sulfide to other catalyst greater than 4:1, preferably greater than 10:1 and most preferably 0, since most preferably, no other catalyst is present in the formulation of the present invention.

Foam formulations of the present invention include a polyol component. The polyol component of the foam formulation can be any polyol or polyol mixture which can be used to prepare a foam which can withstand the rigorous physical property and handling requirements of foams used in carpet applications. For example, the polyol component can preferably be a polyol mixture having as one part of the mixture a polyol based on a $C_3$–$C_8$ alkylene oxide, which has an equivalent weight of about 1000 to about 5000, and an internal poly(ethylene oxide) block or a terminal ethylene oxide cap constituting about 15 to about 30 percent of the weight of the polyol, or mixture of such polyols wherein the polyol or mixture thereof has an average functionality of about 1.8 to about 2.2. The other portion of the polyol mixture is preferably a minor amount of a low equivalent weight compound having about 2 active hydrogen containing groups per molecule.

Another example of the present invention is a polyurethane foam prepared from a formulation such as those disclosed by U.S. Pat. No. 5,104,693 to Jenkines. In formulations of this type, the polyol component can be at least one isocyanate reactive material having an average equivalent weight of about 1,000 to about 5,000. The polyisocyanate can be any polyisocyanate in an amount to provide an isocyanate index of about 90 to about 130, wherein at least 30 percent by weight of the polyisocyanate is a soft segment prepolymer which is the reaction product of a stoichiometric excess of MDI or an MDI derivative and an isocyanate reactive organic polymer having an equivalent weight from about 500 to about 5,000, the prepolymer having an isocyanate group content of about 10 to about 30 percent by weight.

The foams of the present invention are prepared using blowing agents and, optionally, fillers. The blowing agent is preferably air, however, other gasses, such as carbon dioxide, nitrogen, and the like can be used. The blowing agent is preferably introduced into the polymer by frothing. A frother is a device which injects air into an admixture as it agitates the admixture. When included in the foam formulations of the present invention, the fillers can be aluminum oxide trihydrate (alumina), calcium carbonate, barium sulfate or mixtures thereof. Other fillers can also be used.

While the above polyisocyanates, fillers and polyols are examples of useful materials which can be included in the formulations of the present invention, other materials can also be used. The polyisocyanate component of the formulations of the present invention can be advantageously selected from organic polyisocyanates, modified polyisocyanates, isocyanate-based prepolymers, and mixtures thereof. These can include aliphatic and cycloaliphatic isocyanates, but aromatic and especially multifunctional aromatic isocyanates are preferred. Preferred polyisocyanates are 2,4- and 2,6-toluenediisocyanate and the corresponding isomeric mixtures; 4,4'-, 2,4'- and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI and toluene diisocyanates. Also useful for preparing the polyurethanes of the present invention are aliphatic and cycloaliphatic isocyanate compounds such as 1,6-hexamethylene-diisocyanate; 1-isocyanato-3,5,5-trimethyl-1-3-isocyanatomethyl-cyclohexane; 2,4- and 2,6-hexahydrotoluenediisocyanate, as well as the corresponding isomeric mixtures; 4,4'-, 2,2'- and 2,4'-dicyclohexylmethanediisocyanate, as well as the corresponding isomeric mixtures.

Also advantageously used for the polyisocyanate component of the formulations of the present invention are the so-called modified multifunctional isocyanates, i.e., products which are obtained through chemical reactions of the above diisocyanates and/or polyisocyanates. Exemplary are polyisocyanates containing esters, ureas, biurets, allophanates and preferably carbodiimides and/or uretonimines; isocyanurate and/or urethane group containing diisocyanates or polyisocyanates. Liquid polyisocyanates containing carbodiimide groups, uretonimine groups and/or isocyanurate rings, having isocyanate groups (NCO) contents (42/ polyisocyanate mwt) of from about 10 to about 40 weight percent, more preferably from about 20 to about 35 weight percent, can also be used. These include, for example, polyisocyanates based on 4,4'-, 2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and PMDI and mixtures of toluenediisocyanates and PMDI and/or diphenylmethane diisocyanates.

Suitable prepolymers also useful with the present invention are prepolymers having NCO contents of from about 5 to about 40 weight percent, more preferably from about 15 to about 30 weight percent. These prepolymers are prepared by reaction of the di- and/or poly-isocyanates with materials including lower molecular weight diols, triols, but also they can be prepared with multivalent active hydrogen compounds such as di- and tri-amines and di- and tri-thiols. Individual examples are aromatic polyisocyanates containing urethane groups, preferably having NCO contents of from about 5 to about 40 weight percent, more preferably about 20 to about 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, polyoxypropylene glycols and polyoxypropylenepolyoxyethylene glycols can be used.

Particularly useful in the present invention are: (i) polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from about 20 to about 35 weight percent, based on the weight of the prepolymer, prepared by the reaction of polyoxyalkylene polyols, having a functionality of preferably from 2 to 4 and a molecular weight of from about 800 to about 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluene-diisocyanate and the corresponding isomeric mixtures. PMDI in any of its forms can also be used and is preferred. In this case it preferably has an equivalent weight between about 125 and about 300, more preferably from about 130 to about 175, and an average functionality of greater than about 2. More preferred is an average functionality of from about 2.5 to about 3.5. The viscosity of the polyisocyanate component is preferably from about 25 to about 5,000 centipoise (cps) (0.025 to about 5 Pa•s), but values from about 100 to about 1,000 cps at 25° C. (0.1 to 1 Pa•s) are preferred for ease of processing. Similar viscosities are preferred where alternative polyisocyanate components are selected. Still, preferably, the polyisocyanate component of the formulations of the present invention is selected from the group consisting of MDI, PMDI, an MDI prepolymer, a PMDI prepolymer, a modified MDI and mixtures thereof.

Polyfunctional active hydrogen containing materials useful with the present invention can include materials other than those already described hereinabove. Active hydrogen containing compounds most commonly used in polyurethane production are those compounds having at least two hydroxyl groups. Those compounds are referred to herein as polyols. Representatives of suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp. 5–6,198–199 (1964); *Organic Polymer Chemistry* by K. J. Saunders, Chapman and Hall, London, pp. 323–325 (1973); and *Developments in Polyurethanes*, Vol. I, J. M. Burst, ed., Applied Science Publishers, pp. 1–76 (1978). However, any active hydrogen containing compound can be used with the present invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also preferred are poly(oxypropylene) glycols, triols, tetrols and hexols and any of these that are capped with ethylene oxide. These polyols also include poly (oxypropyleneoxyethylene)polyols. The oxyethylene content should preferably comprise less than about 80 weight percent of the total polyol weight and more preferably less than about 40 weight percent. The ethylene oxide, when used, can be incorporated in any way along the polymer chain, for example, as internal blocks, terminal blocks, or randomly distributed blocks, or any combination thereof.

Polyamines, amine-terminated polyols, polymercaptans and other isocyanate-reactive compounds are also suitable in the present invention. Polyisocyanate polyaddition active hydrogen containing compounds (PIPA) are particularly preferred for use with the present invention. PIPA compounds are typically the reaction products of TDI and triethanolamine. A method for preparing PIPA compounds can be found in, for example, U.S. Pat. No. 4,374,209, issued to Rowlands.

Another preferred class of polyols are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyronitrile; copolymer polyol stabilizers; and chain transfer agents such as isopropanol.

It is often preferable to premix all of the components except the polyisocyanate (and the blowing agent when a gas is used) to form a "B" component. The polyisocyanate and the B component are admixed and then the blowing agent gas is blended in using, for example, an OAKES FROTHER* (*OAKES FROTHER is a trade designation of the E. T. Oakes Corporation). The composition is preferably applied to a textile or other substrate prior to any significant level of curing using equipment such as a doctor knife, air knife, or extruder to apply and gauge the layer. In the alternative, the forming polyurethane can be applied by forming it into a layer using a moving belt, allowing it to partially cure, and then marrying it to the textile using equipment such as a double belt laminator. After application of the foam layer, the polyurethane is cured by applying heat by means of an infrared oven, open flame forced draft convection impingement oven, heated plates or the like.

Textiles useful with the present invention can include broadloom carpet, automotive carpet, fabrics for automotive trim and automotive trunk liners. In addition, the textiles useful with the present invention can include synthetic playing surfaces, woven polymeric scrim, non woven polymeric scrim, wall coverings, sheet polymers, furniture covers, and the like. One preferred embodiment of the present invention is carpet tile prepared by incorporating the catalysts of the present invention into a carpet tile production process such as that disclosed in U.S. Pat. No. 4,657,790 to Wing, et al. The '790 Wing, et al. patent is incorporated herein by reference.

In addition to carpets, the present invention can be used to prepare furniture covers, wall coverings, and the like.

The following examples are provided to illustrate the present invention. The examples are not intended to limit the scope of the present invention and they should not be so interpreted. Amounts are in weight parts or weight percentages unless otherwise indicated.

EXAMPLE 1

A polyurethane foam backed textile is prepared according to the formulation below in Table 1 by:

a. placing the indicated amount of polyols in a suitably sized container and admixing using a 2 inch (5.08 cm) OAKES FROTHER* and a 3 foot (0.9144 m) belted pilot coater;

b. The indicated amount of D-70* calcium carbonate filler (*D-70 is a trade designation of Georgia Marble Company) is added to the polyol while under high sheer agitation;

c. The indicated amount of H-36U* hydrated alumina (*H-36U is a trade designation of Solem Industries) is added to the polyol while under agitation;

d. The indicated amount of silicone surfactant is added to the polyol while under agitation;

e. High shear agitation of the polyol/filler compound is continued until a temperature of 50 degrees centigrade (°C.) is reached in order to thoroughly disperse and break up agglomerate filler particles;

f. The polyol/filler compound is cooled to about 20° C.;

g. The indicated amount of the isocyanate component is added to the polyol/filler compound and the two thoroughly mixed;

h. The indicated amount of polyurethane catalyst is added to the reaction mixture with agitation;

i. Air is metered into the reaction mixture and frothed to a foam of approximately 0.66 g/cc density;

i. The foam is applied to a nonwoven fleece conveyed on a TEFLON* and fiberglass belt which is then married to a tufted carpet having a previously applied polyurethane precoat layer.

j. Final cure is achieved by means of heated platens and a convection oven.

The resultant carpet is a composite consisting of a carpet face, polyurethane precoat, polyurethane cushion, and nonwoven fleece. The carpet is prepared with reduced back pressure compared to conventional processes and has improved flow-out, lower froth viscosity, and no premature gellation. Physical properties are shown below in Table 2.

EXAMPLE 2

A polyurethane foam of the present invention is prepared and tested for physical properties. The formulation components are shown below in Table 1 and are admixed as in Example 1 except that the foam is applied directly to the TEFLON and fiberglass belt, cured, and then removed for physical testing. The physical properties are shown below in Table 2

COMPARATIVE EXAMPLE 3

A polyurethane foam is prepared and tested substantially as in Example 2 except that a conventional polyurethane catalyst is used. The formulation components are shown below in Table 1 and physical properties are shown below in Table 2.

TABLE 1

|  | EXAMPLE 1 (pph)* | EXAMPLE 2 (pph) | COMPARATIVE EXAMPLE 3** (pph) |
| --- | --- | --- | --- |
| VORANOL 9741[1] | 88 | 90 | 90 |
| Diethylene Glycol | 12 | 10 | 10 |
| D-70[2] | 60 | 60 | 60 |
| H-36U[3] | 50 | 50 | 50 |
| Surfactant[4] | 0.7 | 0.50 | 0.50 |
| Catlyst-UL-29 | — | — | 0.015 |
| Catalyst-Dibutyltin sulfide | 0.009 | 0.009 | — |
| Polyisocyanate[6] | 49.9 | 44 | 44 |

*Parts per hundred parts of component
**Not an example of the present invention
[1]VORANOL 9741 is a 4,800 molecular weight ethylene oxide capped propylene oxide polyether polyol having a nominal functionality of 3 and is also a trade designation of The Dow Chemical Company.
[2]D-70* is a calcium carbonate filler and is a trade designation of Georgia Marble Corporation.
[3]H-36U* is hydrated alumina and is a trade designation of Solem Industries.
[4]L-5440 which is a silicone surfactant and is a trade designation of OSI Specialties, Inc..
[5]UL 29 is Dioctyltin diisooctylmercaptoacetate and is a trade designation of Witco Chemical Corp.
[6]ISONATE 7045 which is a PMDI prepolymer having an NCO content of about 27.5 percent and is a trade designation of The Dow Chemical Company.

TABLE 2

|  | EXAMPLE 1 | EXAMPLE 2 | COMPARATIVE** EXAMPLE 3 |
|---|---|---|---|
| Temperature at exit from mixer in °C. | 36 | 36 | 29 |
| Back pressure, psi/kPa | 96/662 | 107/738 | 125/862 |
| Time to full cure in 135° C. oven (m:sec) | — | 1:30 | 1:15 |
| Density, pcf/kg/M$^{3A}$ | 14.0/224 | 19.3/309 | 19.3/309 |
| thickness, in./cm$^A$ | 0.275/0.70 | 0.200/0.51 | 0.205/0.52 |
| 50 percent compression set, percent$^B$ | 2.3 | 4.0 | 4.8 |
| 25 percent compression resistance, psi$^B$ | 15.3 | 16.7 | 16.8 |
| Resiliency, percent$^A$ | 34 | 37 | 33 |
| Tensile psi/kPa$^C$ | — | 58.9/406 | 61.8/426 |
| Elongation, percent$^C$ | — | 76.3 | 78.1 |
| Tear, lb./in./kg/cm$^C$ | — | 6.2/1.11 | 5.1/0.91 |

**Not an example of the present invention
$^A$ASTM D3676
$^B$50 percent compression set: 2 inch × 2 inch samples are stacked to about 2 inches in height, measured to the nearest 0.001", compressed to about 1 inch, and held at 70° C. for 22 hours. After 22 hours, compression is removed from the samples and the samples are held at 70° C. for an additional 30 minutes. Samples are measured for thickness to the nearest 0.001 inch and 50 percent compression set is calculated as:

$$50\% \text{ compression set} = \frac{\text{(initial thickness} - \text{final thickness)}}{\text{initial thickness}} \times 100$$

25 percent compression resistance: 2 inch × 2 inch samples are compressed under 0.22 psi and the thickness of the samples measured to the nearest 0.001 inch. The samples are then compressed to 75 percent of original thickness and the pressure necessary for this compression determined. Results are reported in psi and represent the average of two samples.
$^C$ASTM D3575

What is claimed is:

1. A process for preparing a polyurethane backed textile comprising the steps of
   (A) admixing a polyurethane formulation including
      (1) a polyisocyanate selected from the group consisting of MDI, PMDI, an MDI prepolymer, a PMDI prepolymer, a carbodiimide modified MDI, a uretonimine modified MDI, and mixtures thereof,
      (2) an active hydrogen containing compound, and
      (3) a delayed action catalyst,
   wherein the delayed action catalyst is a dialkyltin sulfide, the alkyl groups of the dialkyltin sulfide are methyl, butyl or octyl groups, and the formulation is substantially free of other polyurethane catalysts; and
   (B) applying the polyurethane formulation admixture to a textile.

2. The process of claim 1 wherein the dialkyltin sulfide is dibutyltin sulfide.

3. The process of claim 2 including an additional step (C) wherein the polyurethane formulation admixture is cured by heating.

4. The process of claim 3 wherein the polyurethane formulation is admixed by means of a frother.

* * * * *